United States Patent

Skenderoff et al.

[15] 3,644,889

[45] Feb. 22, 1972

[54] SYMBOL RECOGNITION SYSTEM, PARTICULARLY FOR ALPHA-NUMERIC CHARACTERS UTILIZING ELECTRO-OPTICAL TECHNIQUES WITH NONCOHERENT LIGHT

[72] Inventors: Claude Skenderoff; Jean-Pierre Bouron, both of Paris, France

[73] Assignee: Thomson-CSF, Paris, France

[22] Filed: Apr. 23, 1970

[21] Appl. No.: 31,276

[30] Foreign Application Priority Data

May 6, 1969 France ......................................14453

[52] U.S. Cl. ..................................340/146.3 G, 250/219 CR

[51] Int. Cl. ..........................................................G06k 9/08

[58] Field of Search..............................340/146.3; 235/181; 250/219 CR, 219 DQ

[56] References Cited

UNITED STATES PATENTS

| | | | |
|---|---|---|---|
| 3,167,744 | 1/1965 | Rabinow | 340/146.3 |
| 3,255,436 | 6/1966 | Gamba | 340/146.3 |
| 3,292,148 | 12/1966 | Giuliano et al. | 340/146.3 |
| 3,496,542 | 12/1970 | Rabinow | 340/146.3 |
| 3,252,140 | 5/1966 | Lemay et al. | 340/146.3 |
| 3,227,034 | 1/1966 | Shelton, Jr. | 340/146.3 |

*Primary Examiner*—Maynard R. Wilbur
*Assistant Examiner*—Leo H. Boudreau
*Attorney*—Flynn & Frishauf

[57] ABSTRACT

An optical multiplier, such as a fly's eye lens projects a symbol to be recognized on a plurality of masks, which are subdivided into strips, each strip of the mask having predetermined transparencies and transmitting elementary sections of the image to associated photoelectric transducers which are connected to logic circuits identifying those of the transducers associated with any one strip which, conjointly, have an extreme (e.g., maximum) output signal. Preferably, optical or electrical weighting elements are interposed to optimize the outputs of the transducers associated with the various masks.

5 Claims, 6 Drawing Figures

SYMBOL RECOGNITION SYSTEM, PARTICULARLY FOR ALPHA-NUMERIC CHARACTERS UTILIZING ELECTRO-OPTICAL TECHNIQUES WITH NONCOHERENT LIGHT

The present invention relates to symbol recognition systems, and more particularly to systems to recognize alphanumerical characters utilizing optical correlation techniques. It is especially adapted to recognize printed, or typed characters.

Symbol, and alpha-numeric character recognition systems, particularly for typed and printed symbols and using optical correlation systems have previously been proposed. The optical correlation function is utilized to detect and to localize a known signal and separate the signal from a group of other signals not indicating a recognition. Such separation may be considered analogous to the recognition of a specific signal within random noise. The signal selected will, with respect to the correlation function, be an extreme value, typically a maximum. The correlation function of one known function, with respect to an input data function is a characteristic of the resemblance. Optical means may provide a correlation product, in real time, by illumination with noncoherent light. By means of filters, illumination by coherent light can be obtained, the filters breaking up the light into spaced specific frequencies; by means of conversion elements, a correlation function is real time can again be obtained.

Utilization of noncoherent light has the advantage of substantial simplicity with respect to illumination by coherent light, does not require special precautions, and avoids the use of delicate filter systems.

Various types of systems have been proposed to utilize optical correlation techniques with noncoherent light. In one system, an overall shape is recognized by utilizing vignettes, or masks, calculated by means of a computer. Such systems provide for fairly good discrimination between symbols to be recognized. Other methods utilize arrangements in which symbol to be recognized is decomposed into geometric elementary elements. Such systems provide good recognition with little ambiguity, better than overall symbol recognition above referred to, but require a comparatively long processing. Optical resolution of elementary shapes or forms, in this way, may be referred to as optical-syntactic systems. In accordance with this system, correlation is obtained by analyzing a detail and comparing it with a larger image; difficulties have been experienced since the portions of light received from the masks, and the sections of the form to be recognized, may have substantial differences.

Symbol recognition systems, operating either by overall character recognition, or by the optical-syntactic system provide an identification which is unambiguous if the forms to be analyzed and the standard patterns carried on, or transduced by masks have a high degree of resemblance, and if the numbers, or the families of distinct forms to be recognized are quite limited. If, however, the shape to be recognized is more or less deformed, or spacially offset with respect to the standard, or given function, as represented by a mask, for example, and when the number of possibilities of symbols to be recognized is increased, the probability of false identification and of ambiguities is greatly increased. In other words, undesirable intercorrelations result. Additionally, a decrease of desired signal above the noise level arises, resulting in wrong output indications, and application of spurious signals to the electronic units processing the correlation signals obtained by photoelectric detection.

It is an object of the present invention to provide an optical-electrical symbol recognition system using noncoherent light, operative in real time, which has a high degree of error rejection and provides for identification with a high degree of unambiguity.

Subject matter of the present invention

Briefly, reference correlation functions are carried by masks determined by a syntactic resolution of the forms to be recognized. These functions are, preferably, optimized by computation, for example in a computer. Optimization, obtained by weighting of the correlation functions, as well as the particular arrangement of resolution of the elements, preferably into parallel strips, provides output signals which can be effectively processed.

According to the present invention a symbol recognition system, particularly for alpha-numeric character recognition, comprises:

means projecting, by noncoherent light, a symbol to be identified;

optical multipliers to project an image of the symbol and to provide a plurality of projected images;

a plurality of masks, one for each projected image, each mask being subdivided into P parallel strips, each strip of said mask carrying in form of predetermined transparencies a reference correlation function determined from a syntactic resolution of the symbols to be recognized, with respect to the rank of the elementary section of said symbols, said symbols being considered as subdivided into strips forming P elementary sections;

a plurality of lens means associated with N×P photoelectric transducer means, one each transducer means being located in light receiving relation with respect to a strip of a mask to form a correlating element for each of the N×P strips and responding to the elementary section of the image being projected;

and logic circuit means connected to and supplied by said transducer means, said logic circuit means identifying the projected symbol.

The invention will be described by way of example with reference to the accompanying drawings, wherein.

The optical correlation system of the present invention, and using noncoherent light has two planes supporting information carriers and the functions to be processed. One point C $(x_o, y_o)$ of the correlation function is obtained by multiplication of the first function $f(x, y)$ with the second, that is $g(x, y)$, offset by a certain quantity $(x_o, y_o)$, and then integrating the product to obtain:

$$C(x_oy_o) = \int\int f(x, y) \cdot g(x+x_o, y+y_o) \cdot dx \cdot dy \quad \ldots (1)$$

In order to obtain all points of correlation function, it is thus necessary to measure all possible shifts between the two functions. In a dynamic system, the movement, or offset is mechanically obtained. In a static system, utilized in the present invention, the planes are fixed and the results of the correlation are analyzed by means of a group or set of photo detectors, arranged and spread over the plane of correlation, or by means of a photosensitive target in the plane, associated with an electric signal processing circuit.

Figure 1:
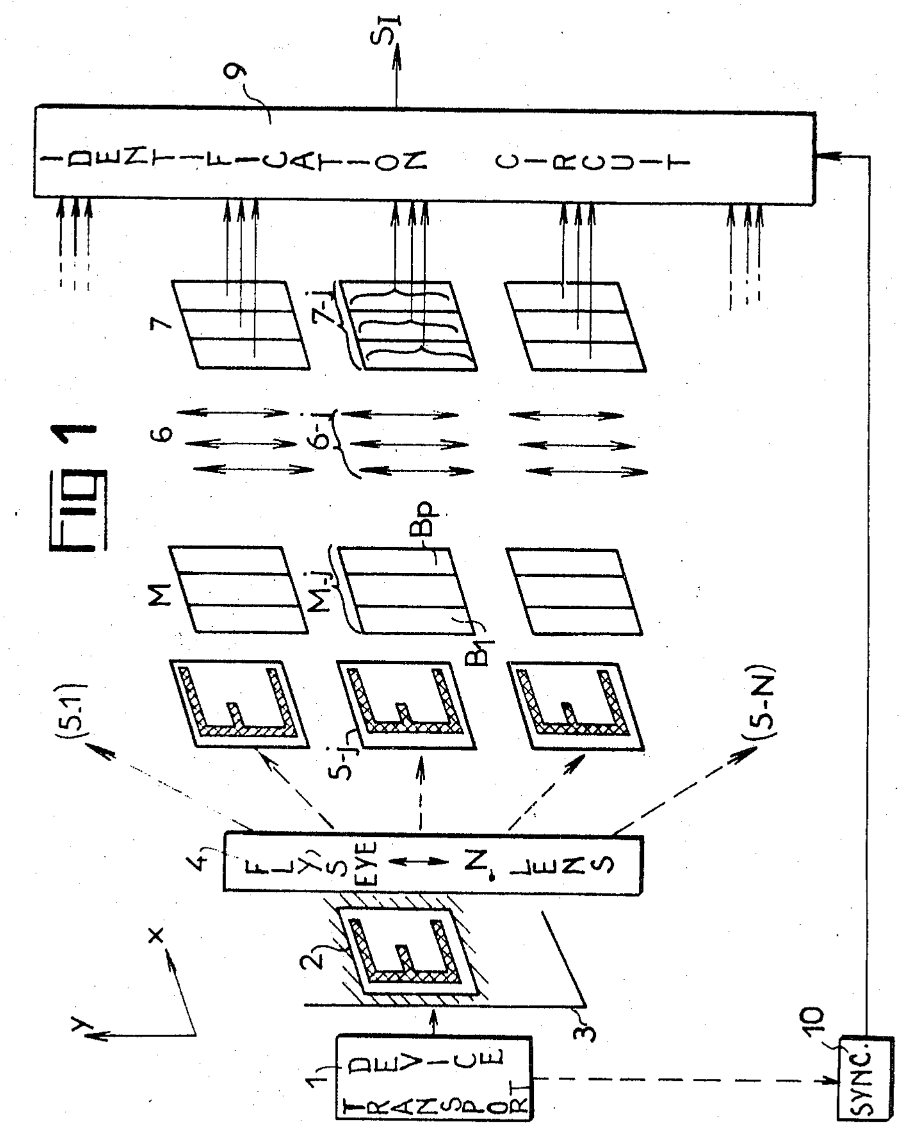
FIG. 1 illustrates, in highly schematic form, the entire symbol recognition system.

The general overall identification system is shown, in simplified form, in FIG. 1, and will be explained in connection with a reading system to recognize alphabetical characters. Of course, the invention is not limited to such recognition but may recognize any symbols, provided that the graphical representation of the symbol can have sufficient similarity with a master pattern, and is sufficiently different from all other symbols so that spurious intercorrelations will not arise. Not only symbols, and alpha-numerical characters can be recognized, but also shapes, drawings, or the like presented for example, on a photographic film.

The symbol or character is displayed in a window 2 in a display plane 3. The character is moved past window 2 by means of a transport mechanism 1, shown schematically in block form only and which may be any known transport device. The motion is in the direction of the *x*-axis, of a coordinate system *x-y*, indicated above plane 3. The dimensions of window 2 are so chosen that they cover the entire height of the symbols or characters, and their width corresponds to a step of the spacing in the *x*-axis between successive characters. Transport of the symbols is in the direction of the *x*-axis.

The characters can be displayed in the window either on a variable transparency, as an optical image formed thereon, or in any other manner. The transport mechanism 1 may be entirely electrical, electromechanical, or the like and may include a film gate and transport mechanism, window 2 then forming a mechanical vignette, or mask, illuminated by means of a diffused light source.

In accordance with another example, an optical-mechanical device may scan, line by line, the document or symbol to be analyzed and provide successive projection of characters on window 2.

The noncoherent, diffused light coming from window 2 is applied to an optical element 4 which is a fly's eye lens which produces N images of the character to be identified on projection planes 5–1... 5–j... 5–N which form, in space, as many objective planes as characters to be identified are present, having applied thereto the function $f(x, y)$. Each one of these objective planes, such as 5–j has an associated mask M associated therewith, such as mask M*j*. The masks are subdivided into strips, each strip forming an elementary mask section and having a transfer function $g(x, y)$ in the form of a variable transparency. The strips dividing the mask extend in the Y-direction, at right angle to the X-direction of transport of the characters before window 2. Each mask M has associated therewith a lens system 6, imaging the received character, through the mask, on a photodetector transducer system 7. The outputs from the transducers 7, after signal processing, are applied to a logic circuit 9.

Figure 2:
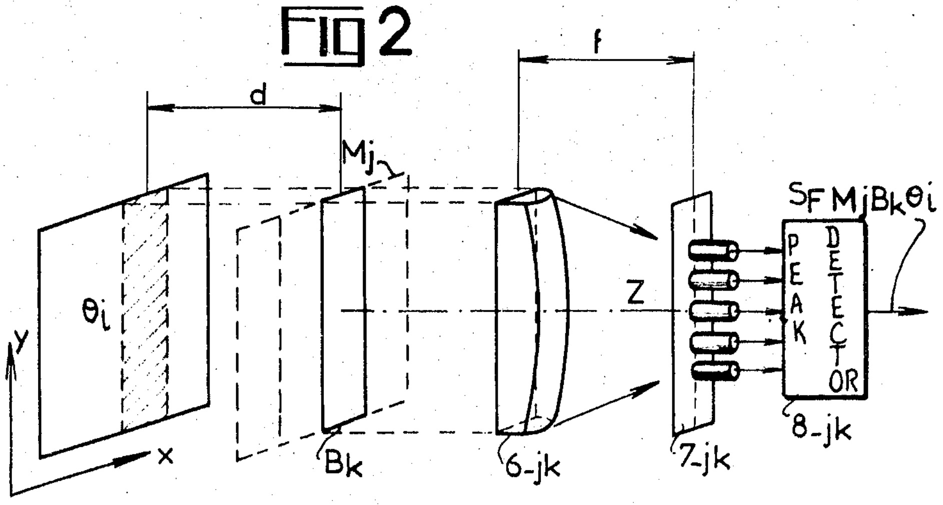
FIG. 2 is a detail view of a portion of FIG. 1.

FIG. 2 illustrates the correlation of characters, and the formation of the correlation functions, and the particular arrangement of masks M, lenses 6, transducers 7, and a signal level detector circuit 8 in greater detail.

The correlation system is best explained in connection with FIG. 2. The correlation function itself, is obtained N×P times in the system, since each one of the N masks M is divided into P strips. The distance between the planes of the functions to be correlated is generally chosen to be equal to the focal distance $f$ of the objective lens systems 6. Each one of the lens systems 6, for example system 6–*j* (FIG. 1) associated with any one mask includes a group of similar lens subsystems, one each associated with one of the strips. Thus, see FIG. 2—strip $B_k$ on mask M has an associated lens element 6 6–*jk*, of focal length $f$ directing illumination from the strip $B_k$ on a plane at which transducers 7–*jk* are located. The distance separating the mask M from the optical elements 6 is preferably very small, FIG. 2 showing the distance greatly enlarged and out of scale for ease of illustration. The plane face of the lens element 6, of a plane-convex lens may be practically in contact with the strip Bk with which it is associated.

In accordance with the invention, the correlation plane carries photosensitive elements, preferably a plurality of photodetectors arranged side by side in the *y*-axis. In a preferred form, the photo transducers are formed of vertical stacked elements to provide a compact detection system. The arrangement of the individual photodetectors themselves is preferably chosen to be symmetrical with respect to a central element in line with the optical axis Z of the lens element 6, so that an odd number of photosensitive elements is used. Such a distribution, with the center one of a group of photosensitive elements lying on the optical axis permits variations in the vertical positioning of the characters without substantially detracting from readability and recognition, and provides some freedom from constraints of accuracy in locating the symbols to be recognized within the window.

The signals detected by the transducer elements 7, for example 7–*jk* are applied to a circuit 8–*jk*, which may be of known type, and which provides for selection of the signal $S_F$ forming an extreme, for example of the maximum signal and corresponding to the product of the maximum correlation existing at the instant of measurement being applied to the group of detectors, under consideration. The dimensions of the photosensitive detecting surfaces, and their spacing from each other, or steps, in the Y-directions are determined as a function of the amplitude, in space, of the peak of the autocorrelation functions with respect to the shape of the symbols to be recognized. The elementary detector 7–*jk* are preferably formed as solid-state miniaturized circuits, one group being, for example, formed as a linear mosaic of photosensitive diodes, or photosensitive transistors, as an integrated circuit.

The identification system thus is formed of N×P static optical correlators, illuminated by noncoherent light and producing as many detection signals which are applied to an identification logic circuit 9. The information content $S_l$ can then be analyzed in circuits connected to the identification logic, or contained therein, and not further described, and which may include for example computer circuitry, memory and storage networks, remote readout devices, printout elements and the like. The use of the system is particularly applicable to continuous reading of documents to be analyzed, forming, for example, text material passing continuously, in successive characters, line for line, before window 2. A synchronizing circuit 10 (FIG. 1) permits control of the transport device 1 and reading of signals which are detected by the photo transducer elements 7 each time when a character to be identified is centered in window 2. Distribution of photodetectors along line *x* and associated with a selection circuit, selecting a maximum level may also be used, similarly to the system described in connection with the *y*-axis. Such a circuit will also be independent of slight offcenter position of the character within the window with respect to the *x*-axis; it may, if desired, be utilized conjointly with additional control of the synchronization of recording the correlation function and placement of the characters.

The processing of the signals obtained from the photodetectors depends on the reference function $g(x, y)$ carried by the strips, and the criteria which are used to define the correlation functions. In accordance with the invention, these criteria are based on the known principle of resolving symbols into elementary portions, referred to as syntactic resolution. Such a resolution can be obtained by first considering the total area defined by the window 2 and subdividing the window area into P vertical strips by the associated masks. As a result, the symbol to be recognized is split into a series of elementary areas, each one subjected to separate treatment. The correlation of the received optical signal with the several strips can then be analyzed, and the task of discrimination between symbols of similar shape is lessened with respect to that of known systems utilizing optical-syntactic correlation.

Figure 3:
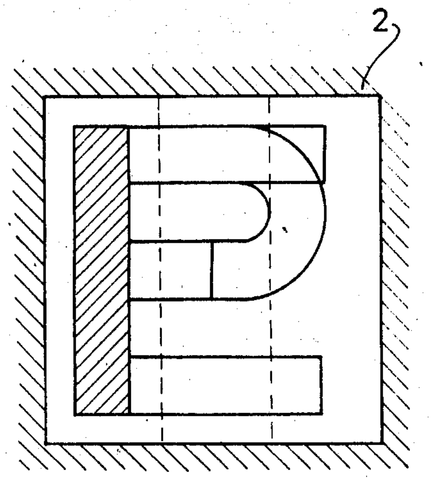
FIG. 3 is a schematic illustration illustrating the principle of optical-syntactic resolution of alpha-numeric characters as utilized in the system.

The definition of the elementary symbol area and its comparison with standard graphs, or drawings of the symbols is carried out by the strip-subdivision of the characters to be recognized, one of the strips being shown in FIG. 2 as $\theta_i$. It is thus possible to define for each strip a plurality of elementary areas associated with a symbol, each such elementary area being common to several letters of a family. FIG. 3 illustrates, for example, a symbol having a vertical bar in the first band, which, for example, is common to the characters E, L, F, F.... and so on; as another example, not shown, a general ellipse, or curve will be common in the first strip to the letters O, C, Q, G.... A vertical bar in the center strip would, for example, be common to the characters I, T. In the illustration shown in FIG. 3, three vertical strips are illustrated.

In order to reduce cross correlations, and improve the discrimination between characters having similar elementary elements, the signals obtained from circuit 8 are weighted. The extent of the weighting of the signals can be calculated, for example by means of a computer. The weighting itself of the N×P correlation signals can be carried out optically, and or, electrically. The detected signals are then compared, by circuitry and in systems well known, with respect to certain threshold levels, or with a single threshold level, in accordance with criteria derived from calculation, or by experiment, that is by comparison of relative levels of correlation signals and signals obtained from transducer circuits which are not associated with the particular symbol to be recognized.

Figure 4:
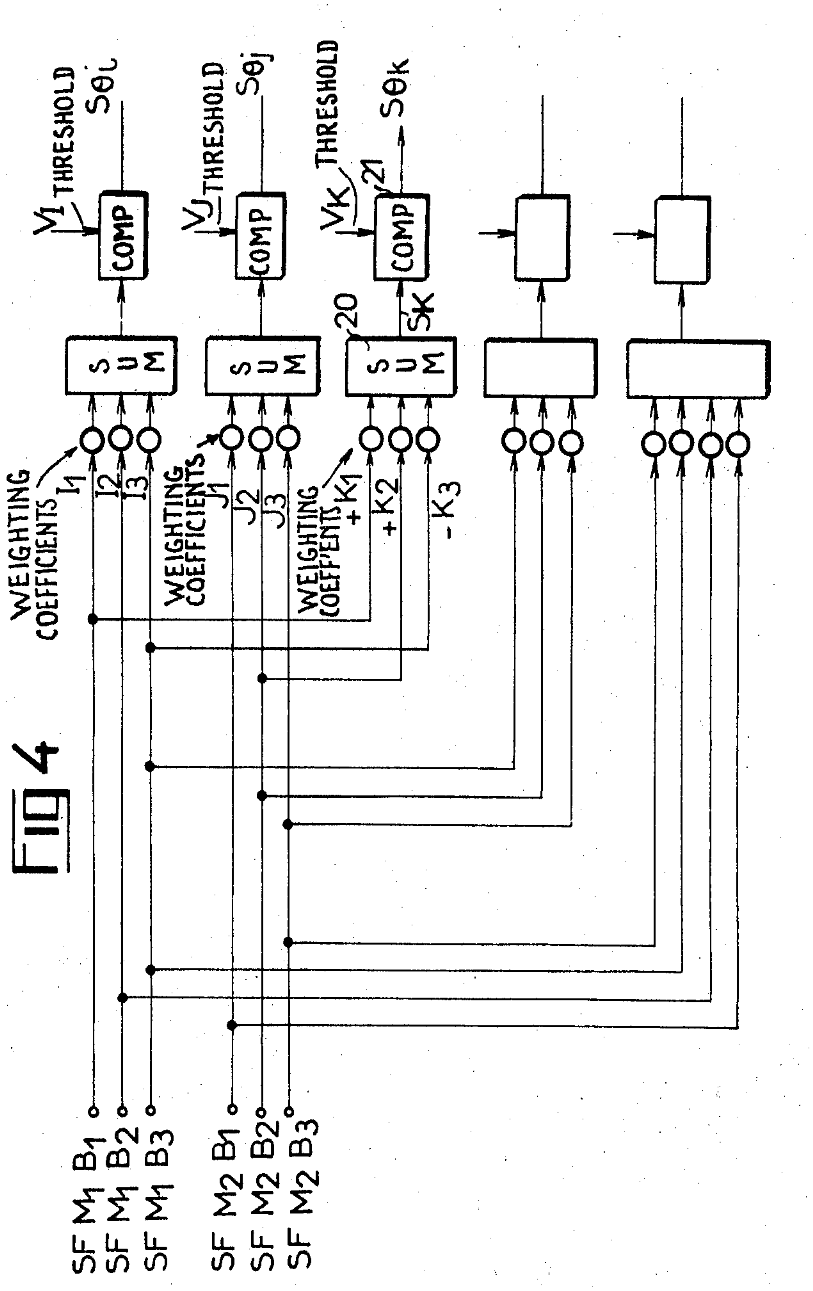
FIG. 4 is a partial schematic circuit diagram illustrating electrical weighting of signals.

Electrical weighting is illustrated in FIG. 4. The weighting coefficients themselves, which may be positive or negative, are applied to the signals having an extreme, for example the highest level. Each character is recognized by subdividing its image into strips, for example three or more, and obtaining as many output signals to be weighed, as vertical strips are provided. These weighed signals are then compared with a threshold level. For ease of explanation, two masks, each subdivided into three strips will be assumed in FIG. 4, permitting recognition of five different distinct forms, although in an actual symbol recognition apparatus for alpha-numerical symbols, a finer subdivision, with more strips and a larger number of masks would be used.

The signals SF coming, for example, from the detectors associated with mask 1, and strips 1 and 3, as well as from mask 2, strip 2, are weighed by applying to their amplitude respective coefficients $+K_1$, $-K_3$ and $+K_2$. The outputs of the weighed signals are applied to a summing circuit 20 and therein compared with a threshold level signals $V_K$ in a comparator 21. The combination of the weighting coefficient multipliers, summing circuit 20 and comparator 21 forms the recognition channel for a symbol $\theta K$. The identification signal $S\theta K$ will appear when the symbol $\theta K$ is present in window 2. Simultaneously, the other channels, and having, for example, output signals $S\theta_i$ and $S\theta_j$ will not provide output signals, since their level will be below that of the threshold. The various threshold levels $V_I$, $V_J$ .... can readily be predetermined by calculation. In comparison with the classical optical resolution system, breaking the symbols into strips, and summing weighted results is a simple, and yet accurate way of identifying predetermined symbols.

Figure 5:
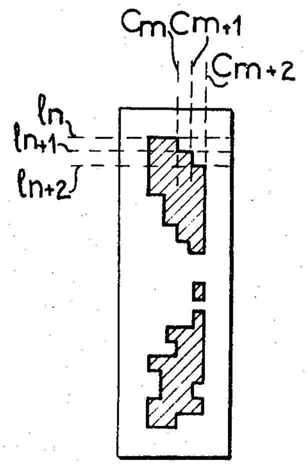
FIG. 5 is a schematic illustration of a strip illustrating the principle of optical weighting by means of matched masks.
Figure 6:
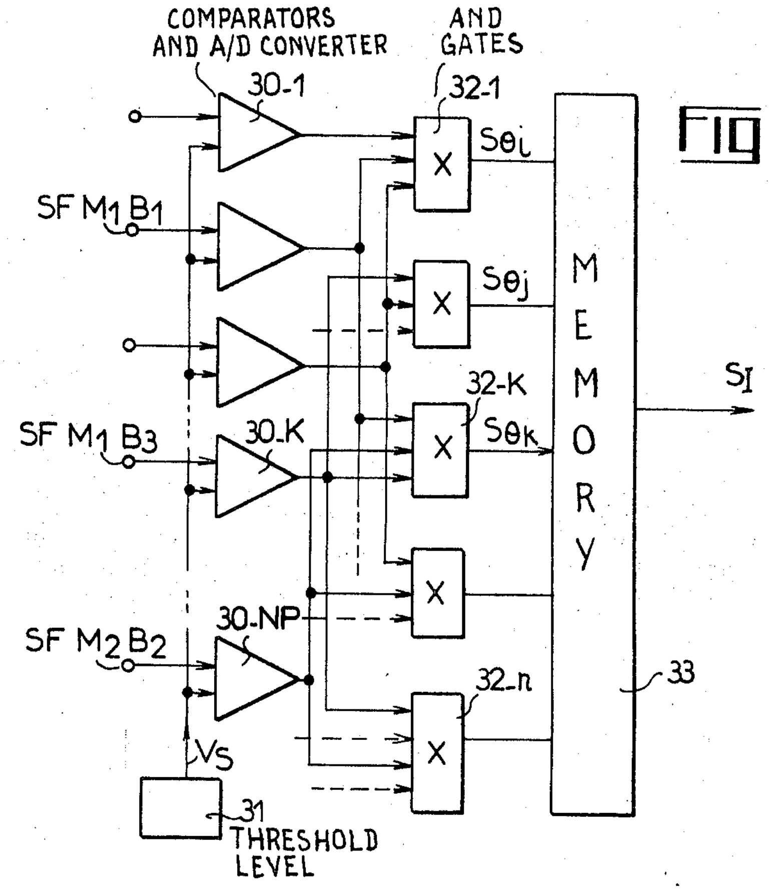
FIG. 6 is a partial circuit diagram illustrating connection of signal processing circuits when used in combination with optical correlation.

Weighting can also be carried out optically (FIGS. 5 and 6). Such weighting can be done by means of elementary masking sections, arranged in accordance with known systems, as particularly disclosed in identification systems utilizing reading of overall shapes. The strips of the symbols are materialized by transparencies having a predetermined transmissivity of light. The elementary areas of these weighting masks or matched masks can, again, be readily determined by calculation, for example by a computer. The overall area of the mask is subdivided into small elementary surfaces, usually in the form of a grid, having rows in the X-direction and columns in the Y-direction. The transmissivity may vary smoothly, or digitally between transparent and opaque areas, which may be assigned the value 0 and 1. In a preferred form, the transparencies are limited to the two values 0 and 1, so that the total light transmitted by the individual weighting mask can be calculated digitally, and the mask element itself prepared photographically. FIG. 5 illustrates, as an example, a configuration of a strip of a weighting mask to weigh a symbol having a vertical bar, such as the left side strip of FIG. 3. After the light passes through the strip, the level of the function of the intercorrelation is optimized with respect to the entire group of the given characters to be recognized. Each elementary surface is a small square, defined by the intersection of successive rows and columns, such as $1_n$, $1_{n+1}$, $1_{n+2}$ etc..., and columns $C_m$, $C_{m+1}$, $C_{m+2}$ etc..., rows (lines) and columns of the grid which are rendered opaque being precalculated.

FIG. 6 shows, in schematic form, an arrangement utilizing optical weighing. The calculation of the optimum transmissivity of the optical masks can be so set that a single threshold $V_S$ can be obtained for all characters, with which the correlation functions supplied by the N×P signals SF are compared to detect the signal having an extreme value exceeding the threshold. Comparison circuits 30–1... 30–NP and each including an analog-digital converter have both the threshold level applied from threshold level generator 31 as well as the output signals SF. When the SF signal is higher than the signal $V_S$ from the threshold detector, an output will be delivered representing a digital ONE; for all levels less than the threshold signal $V_S$, no output will be obtained. A logic matrix formed of AND-gates 32–1 ... 32–n, that is of a number equal to that of the *n* symbols $\theta 1$ to $\theta n$ to be identified has the outputs from circuits 30–l applied thereto for logically decoding the characters to be identified in accordance with outputs obtained from the comparators—analog - digital converters. As an example, the symbol $\theta k$ is identified by signals SF which simultaneously exceed the threshold level $V_G$ when the character $\theta k$ is present, in a manner similar to that illustrated in connection with FIG. 4. The circuit **32–*k* delivers the information identifying the signal $S\theta k$, that is it will provide a ONE input. The inputs to each of the other circuits 32–1 to 32–*n* will have a ZERO, or ONE, but not to all the inputs so that the AND-gates 32 will not respond. Output circuit 33** may be a memory or storage circuit, providing a further output signal $S_I$ to a printout, visualization, or other output network.

If the number *n* of the forms to be identified is high, and if there are substantial resemblances between the forms, optical-electrical identification by correlation becomes difficult. It may thus be desirable to utilize the signals SF obtained from optical correlations through the weighting masks (FIG. 5) in a circuit on the one hand including electrical weighting as described in connection with FIG. 4, and, on the other hand, applying those signals to a circuit as described in connection with FIG. 6, utilizing optical weighting. The output signals obtained, separately, from both systems can then be used separately for identification and, when applied to an additional logic network, may be used to eliminate ambiguities and for verification of consistency of results.

The optical correlation system in accordance with the present invention thus utilizes, conjointly, optical-syntactic resolution of the shapes, symbols or characters to be identified by resolving the characters into spatial division, such as parallel strips, and then processing the resulting correlation signals including weighting of the outputs obtained. In order to recognize characters, division of the area of the character is preferably carried out at least three times, that is, the characters are divided preferably at least into three vertical strips, and weighting is done by utilizing matched masks. Recognizion of alphabetical characters, and particularly of block letters, can be obtained by a comparatively small number of separate photoelectric transducers, and breaking up the characters in elementary symbol areas, the signals from which are weighted by masks, recognition with high discrimination, and low ambiguity is obtained, while utilizing the advantages of optical correlation with noncoherent light.

What is claimed is:

1. Symbol recognition system, particularly for alpha-numeric character recognition, utilizing optical correlation technique in real time with noncoherent light, comprising:

optical projecting means (1, 2, 3, 4) providing a plurality of N of identical projected images (5.1, ...**5–*j*, ...5–N) of a symbol (E, FIG. 1) to be recognized located in a surrounding predetermined area (2**);

a plurality of optical masks (M) each associated with a projected image and subdivided into a determined number P of juxtaposed rows of strips ($B_1$,...$B_p$) parallel to a common direction (Y), said strips forming P elementary masks ($B_k$ $M_j$) in front of each of said projected images to define elementary areas, each of said elementary masks containing, for identification, a partial pattern present in at least one ($\theta_i$) of the *n* different symbols to be recognized ($\theta_1$, ...$\theta_i$, ...$\theta_n$), said symbols each being located in said predetermined area to be subdivided in the same manner into P elementary areas, the partial pattern being present in at least one of the elementary areas of the row ($k$) of the elementary masks ($B_k$ $M_j$), the N different elementary areas of a same row ($k$) of strips being weighted, all the elementary masks ($B_k$ $M_j$) of a row ($k$) identifying by correlation the N different partial patterns of a row ($k$), the whole number of said elementary masks of a row ($k$) considered being at most equal to the number $n$ of the different symbols, at least P of said elementary masks of rows 1 to P being utilized for the identification of a projected symbol;

a plurality of optical integrating lens means (6), and photoelectric transducer means (7), responsive to light through the lens means, each of said elementary masks ($B_k$ $M_j$) forming (FIG. 2) with said optical integrating lens (6–$jk$) and a photoelectic transducer means (7$k$) an optical correlator for the elementary area of the corresponding projected area situated in front of said elementary masks;

and identifying circuits (9) connected to and supplied by said transducer means, said identifying circuits including threshold level comparison means.

2. System according to claim 1, wherein each of the photoelectric transducer means (7–$jk$) comprises a linear distribution of transducer elements (FIG. 2) along at least one line parallel to the common direction (Y) of said strips, said elements being symmetrically located with respect to the focus of the associated integrating lens (6–$jk$);

a peak detector (8–$jk$) connected to and supplied by said elements, said peak detector identifying the one of said transducer elements having an extreme output;

said identifying circuits being connected to and supplied by said peak detectors.

3. System according to claim 2, wherein said linear distribution (7–$jk$) comprises a line of odd-numbered elements, the central one of said elements being located at the focus of the associated integrating lens (6–$jk$).

4. System according to claim 2, wherein said elementary masks are matched to enable identification of any one of said symbols by comparing said corresponding extreme output signals to a common threshold level;

said identifying circuits comprising (FIG. 6) threshold comparators; analog digital converters (30–1,...30NP) supplied by said comparators, each of said threshold comparators comparing an extreme output applied to said common threshold level (31), and $n$ logic summing circuits (32–1, ...32–$n$), one for each symbol to be identified, each of said logic summary circuits being supplied by at least P outputs of said converters.

5. System according to claim 14, including electrical weighting means (FIG. 4, I,J,K) comprising summing circuits (20), one for each symbol to be identified, each supplied by at least P outputs of said electrical weighting means which are respectively fed by P extreme output signals, each of said electrical weighting means introducing a multiplication factor of determined value and sign for the corresponding extreme output signals to it applied;

and $n$ threshold comparators (21) supplied respectively by said summing circuits (20), each comparing the output signal of the corresponding summing circuit with a predetermined threshold level ($V_k$).

* * * * *